Patented June 26, 1951

2,557,973

UNITED STATES PATENT OFFICE 2,557,973

OINTMENTS

Wilbur F. Kamm, United States Army, assignor to the United States of America as represented by the Secretary of War No Drawing. Application March 12, 1946,
Serial No. 653,931

1 Claim. (Cl. 167—63)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to cosmetic preparations and particularly to medicinal and protective preparations intended for application to the skin of humans or animals.

It is an object of this invention to prepare cosmetic preparations for application to human or animal skin which preparations will be adhesive even when applied to wet skin or when the skin is subjected to moisture.

It is a further object of this invention to prepare ointments which will protect skin from insects, from the action of vesicant war gases, from injury due to flash burns and injury due to reactive chemicals.

In the development of ointments to be used for protection of skin against vesicant war gases such as mustard gas and lewisite, I have observed that such ointments are relatively ineffective when applied to skin which has been wet as, for example, with perspiration. The plasticized mixtures now used comprising cellulose acetate butyrate or cellulose acetate plasticized with triacetin (glycerol triacetate) have been employed in various preparations in production or under development by the Chemical Warfare Service.

I have found that when preparations containing cellulose acetate butyrate plasticized with triacetin, were applied to a perspiring skin, the triacetin took up the moisture and the cellulose acetate butyrate was slowly precipitated out of the triacetin. The ointment thus lost its plasticity and adhesive powers and the other constituents of the ointment formed pellets and balls which fell off, leaving almost no protective ointment on the skin.

I have discovered that an adhesive ointment can be prepared which is not affected by moisture and which is suitable for use in the various preparations required by the Chemical Warfare Service by the use of adhesive plasticizers instead of the plasticizers now employed. I have found that the most effective adhesive plasticizers are Dow Plasticizers No. 6 (di-(orthoxenyl) monophenyl phosphate) and Dow Plasticizer No. 5 (diphenyl monoorthoxenyl phosphate).

I have successfully prepared antiflash and insect repellent preparations as well as protective ointments in the form of liquids, jellies, creams and pastes, employing the above plasticizers and have found that they are superior to any other similar preparation which does not contain adhesive plasticizers. Although the two plasticizers above mentioned have been found to be the most desirable, my invention is not limited thereto and can employ any other adhesive plasticizers in medicinal or cosmetic preparations for application to human or animal skin.

The advantage of preparations containing adhesive plasticizers lies in the excellent adhesive properties of the preparation even when applied to wet skin, perspiring skin, or when skin coated with the preparation is dipped into water at temperatures up to 50° C. With respect to preparations which are of interest to the Chemical Warfare Service, the following additional advantages are afforded by using Dow Plasticizer No. 6 in lieu of triacetin-cellulose acetate butyrate solution:

1. The preparations are stable, especially to moisture.
2. The adhesive plasticizers do not attack plastic gas mask lenses or plastic watch crystals.
3. The adhesive plasticizer is non-toxic. Single oral doses of 40.0 grams per kilogram of body weight may be fed to guinea pigs without ill effects.
4. Due to the excellent adhesion, the preparation does not have to be reapplied as often and it maintains its protective qualities longer. In fact, the preparation may be applied under water at 45° C. to 50° C. without loss of adhesive properties.

Specific examples of the preferred embodiment of my invention are set forth below. As used herein the ingredients appearing in Example II are intended to be defined as follows: "Ethocel" is a trade name of the Dow Chemical Company for ethyl cellulose; "Duponol" is a trade name of the E. I. duPont de Nemours & Company, Inc., for a group of aliphatic alcohol sulphates; "Flexalin" is a trade name of the Hercules Power Company for diethylene glycol diabietate.

EXAMPLE I

*Antivesicant ointment*

| | Parts |
|---|---|
| Dow plasticizer No. 6 | 48 |
| Dimethyl phthalate | 6 |
| 1,3,4,6,tetrachlor 7,8,diphenyl 2,5,diimino glycoluril | 25 |
| Titanium dioxide | 9 |
| Magnesium stearate | 9 |
| Magnesium oxide | 1 |
| Magnetic black iron oxide | 1.75 |

EXAMPLE II

*Antiflash cream*

| | Parts |
|---|---|
| Ethocel 250 cps., 15% solution in ethanol | 26.0 |
| Flexalin solid | 3.0 |
| Dow plasticizer No. 6 | 7.0 |
| Duponol | 22.0 |
| Borax | 10.0 |
| Zinc borate | 38.0 |
| Water | 2 |
| Ethanol | 11.875 |
| Pigment | 0.125 |

EXAMPLE III

*Insect repellent paste*

| | Parts |
|---|---|
| Dow plasticizer No. 6 | 34 |
| Dimethyl phthalate | 25 |
| Titanium dioxide | 10 |
| Magnesium stearate | 25 |
| Pigment | 1 |

EXAMPLE IV

*Insect repellent liquid*

| | Parts |
|---|---|
| Ethanol | 47 |
| Ethocel 50 c/s | 1 |
| Dow plasticizer No. 6 | 2 |
| Dimethyl phthalate | 50 |

With respect to vesicant preparations which contain active chlorine compounds for protection against war gases (such as 1,3,4,6, tetrachlor 7,8,diphenyl 2,5,diimino glycoluril), I have discovered that the two plasticizers, di-(orthoxenyl) monophenyl phosphate and diphenyl mono-orthoxenyl phosphate, are the only materials which have the necessary adhesive and plasticizing properties under adverse conditions of high moisture, which are non-toxic and are also stable in the presence of the highly active chlorine.

The above descriptive matter is not to be considered in a limited sense and my invention is to be considered as restricted only by the scope of the appended claim.

I claim:

An antivesicant protective ointment for coating the skin consisting essentially of 48 parts of di-(orthoxenyl) monophenyl phosphate, 6 parts dimethylphthalate, 25 parts 1, 3, 4, 6 tetrachlor 7,8, diphenyl 2,5, diiminoglycoluril, 9 parts of titanium dioxide, 9 parts magnesium stearate, 10 parts magnesium dioxide and 1.75 parts of magnetic black iron oxide.

WILBUR F. KAMM.

REFERENCES CITED

The following references are of record in the file of this patent:

UNITED STATES PATENTS

| Number | Name | Date |
|---|---|---|
| 1,612,742 | Putt | Dec. 28, 1926 |
| 1,676,309 | Wright | July 10, 1928 |
| 2,041,264 | O'Kane | May 19, 1936 |
| 2,249,523 | Hiatt | July 15, 1941 |
| 2,390,249 | Hall | Dec. 4, 1945 |
| 2,394,887 | Berl | Feb. 12, 1946 |
| 2,404,698 | Dreyling | July 23, 1946 |
| 2,425,311 | Fauley | Aug. 12, 1947 |

OTHER REFERENCES

Lesser, The Drug and Cosmetic Industry, Inc., Dec. 1943, pages 630, 704. (Copy in P. O. S. L.)